United States Patent [19]

Hill et al.

[11] Patent Number: 5,245,335
[45] Date of Patent: Sep. 14, 1993

[54] TRANSCEIVER SYSTEM FOR COMMUNICATION OVER WIRE LAID ALONG THE PATH OF GUIDED/VEHICLES

[75] Inventors: Lawrence W. Hill, Arlington; Frederick W. Sarles, Lexington, both of Mass.

[73] Assignee: ComSource Systems Corp., Hollis, N.H.

[21] Appl. No.: 708,109

[22] Filed: May 28, 1991

Related U.S. Application Data

[60] Continuation of Ser. No. 115,245, Oct. 30, 1987, abandoned, which is a continuation-in-part of Ser. No. 846,924, Apr. 1, 1986, abandoned, which is a division of Ser. No. 586,863, Mar. 6, 1984, Pat. No. 4,597,082.

[51] Int. Cl.⁵ ............................................. B62D 1/24
[52] U.S. Cl. .................................. 340/941; 340/933; 180/168
[58] Field of Search .................... 340/933, 941, 988; 318/587; 180/168; 364/424.02; 455/41

[56] References Cited

U.S. PATENT DOCUMENTS

| | | | |
|---|---|---|---|
| 3,742,150 | 6/1973 | Sherman et al. | 179/82 |
| 3,996,518 | 12/1976 | Halstead et al. | 455/41 |
| 3,996,555 | 12/1976 | Dow | 340/941 |
| 4,097,808 | 6/1978 | Parke | 325/51 |
| 4,284,941 | 8/1981 | Regueiro | 318/587 |
| 4,529,982 | 7/1985 | Karlstrom | 340/933 |
| 4,556,864 | 12/1985 | Roy | 340/310 |
| 4,576,246 | 3/1986 | Stieber et al. | 180/168 |
| 4,597,826 | 6/1986 | Hill et al. | 371/32 |
| 4,731,867 | 3/1988 | Seabury | 340/941 |
| 4,742,283 | 5/1988 | Bolger et al. | 318/587 |
| 4,782,342 | 11/1988 | Walton | 340/933 |
| 4,791,570 | 12/1988 | Sherman | 318/587 |

OTHER PUBLICATIONS

Hyatt, Jr. et al, "Engineering Circuit Analysis", McGraw-Hill Book Co. 1978 pp. 530, 546, 547.

*Primary Examiner*—Jin F. Ng
*Assistant Examiner*—Brian R. Tumm
*Attorney, Agent, or Firm*—F. Eugene Davis, IV

[57] ABSTRACT

The system comprises transceivers employing identical modems, one located at a fixed position and connected to the wire and one on a vehicle guided along the wire. The transceiver's specialized modems may be connected to a central host which may be a computer, to a programmable controller, or to a communications bus as required. Additional transceivers may be connected to the communications bus for communication between the central host and additional wires. All central host signals are transmitted to all wire connected modems and sent out on all wires. All signals from vehicle modems are transmitted back to the central host. Each transceiver is adapted to employ one or more identical modem, each connected to a different wire. Communication between the wire and a vehicle is by an inductive coupler employing ferrite rods which is designed such that the transfer function from the fixed modem to the vehicle mounted modem is substantially identical to the transfer function from the vehicle modem to the fixed modem. The vehicles may be wired guided vehicles controlled by low frequency signals on the wire. In this case a special coupling circuit is employed so that no modification is required in the equipment normally used to signal along the wire for controlling the vehicle or in the modems connected to the wire. The modems employ state machines for on-off frequency keying detection, a powerful protocol for error free transmission, a specialized circuit that presents different impedances during transmission and reception, and a switching circuit for providing high damping on transmission and low damping on reception.

18 Claims, 12 Drawing Sheets

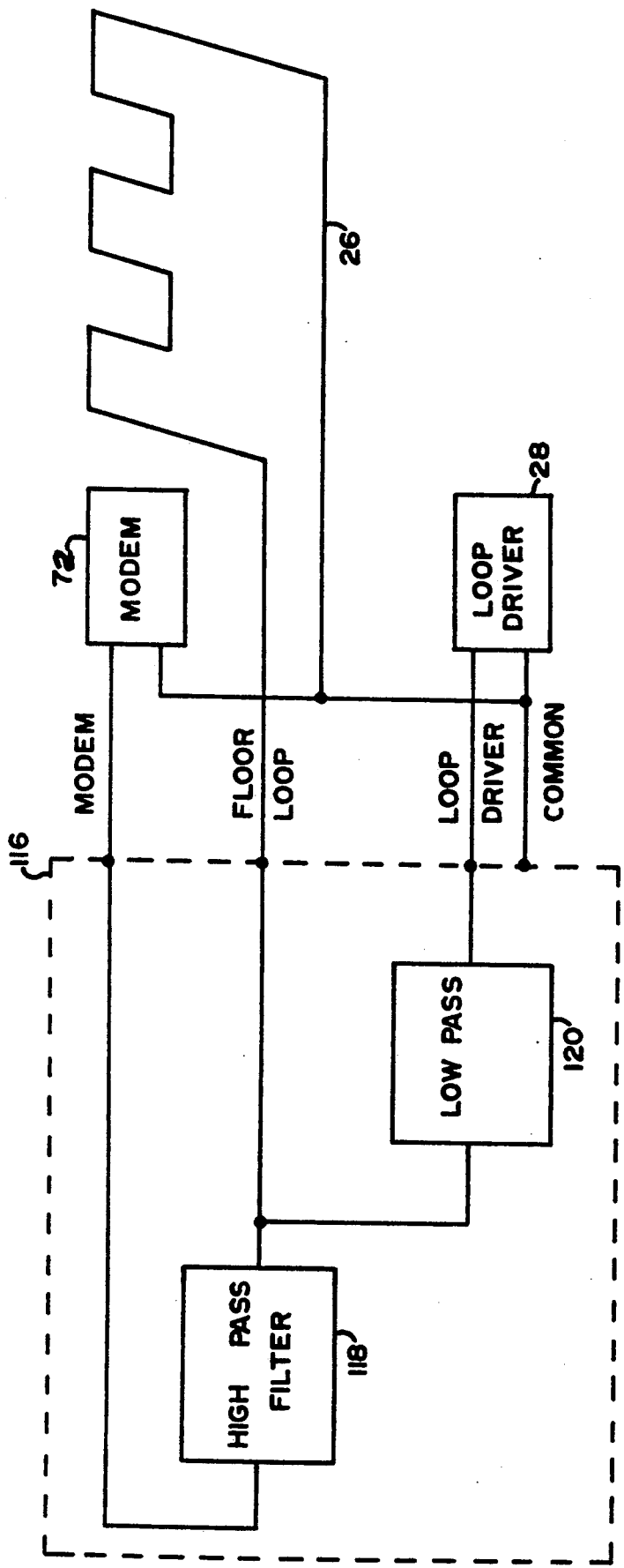

FIG.5

```
:2000000000000000100030004070508060901080209020A020B0D0C0D000D000E000F121014
:20002000131114011302140215021602170200201919141A1B1C1C1D1D1E1F0D000E34
:200040001821192225232624271C261B271C281D29802A801B802C2C2D2D2E2F2F3030D7
:200060000313132201821000000000000000000000000000000000000000093
:20008000564157424543464447546594756585959545A5B5B5C5C5D4B694CCB5FCC604C
:2000A000516C526D536E544055406940557575858595954065A6A6B6B6C6C6D6D6E6E6F705E67
:2000C00006361646265CF64CE65CF66D0674B684BCB4B6B4B6A6A6B6B6C6C6D6D6E6E6F705E67
:2000E0000CB5F000000000000000000000000000000000000000000000D6
:200100002B812C82858386848872F862E872F88308993A932B938C8C8D8D8E8E8F9090F8
:2001200091928028818948C9598969997A8F98F9A8FF9B9EA79FA8ABA9ACA0ADA2AEA3AF40B040E3
:2001400A1A1A2A2A3A3A4A4A59388B949EA79FA8ABA9ACAAADA2ACA1ADA2AEA3AF40B040E3
:20016000E4000000000000000000000000000000000000000000000A1
:2001800DEC1DFC2C5C3C6C4C7E2C6E1C7E2C8E3C95ECA5EDE5ECCCCCCDCDCECECFCFD0D0D2
:2001A000D1D1D2C0DEC1F1D4F2D5D8D6D9D7DAF5D9F4DAF5DBF6DCC0DDC0F1C0DFDFE0E0DE
:2001C000E1E1E2E2E3E4E4E5D3F1D400E700E8EBE9ECEAED01EC01ED01EE01EFD3F0D3D8
:2001E000000D3F2F2F2F3F3F4F4F4F5F5F6F6F7F7F8E600E7000000000000000000F1
:00000001FF
```

© 1987, Comsource Systems Corporation

TRANSCEIVER SYSTEM FOR COMMUNICATION OVER WIRE LAID ALONG THE PATH OF GUIDED/VEHICLES

This application is a continuation of Ser. No. 07/115,245 filed Oct. 30, 1987, now abandoned, which is a continuation-in-part of application Ser. No. 846,924, filed Apr. 1, 1986, now abandoned, which is a divisional of Ser. No. 586,863, filed Mar. 6, 1984, now U.S. Pat. No. 4,597,082. The above applications and patent are hereby incorporated by reference.

TECHNICAL FIELD

This invention relates to a transceiver system for communication over wires laid along the path of guided vehicles. The application also relates to communication with wire guided vehicles, to specialized filters, and to inductive coupling between a vehicle and a wire laid along its path. The invention employs the specialized transceiver for multidrop local area networks disclosed in the above-identified application and patent.

BACKGROUND ART

Various communication schemes have been proposed for communicating with guided vehicles in an industrial environment. Some of these employ radio and infra-red transmission to and from the vehicle from fixed stations along the path of the vehicle. Many of these schemes require the vehicle to stop at particular locations where they can intercept the radio or infra-red beam without interference and communicate. Continuous communication is not permitted.

All such prior art schemes are expensive and subject to high error rates.

We disclosed in the above-identified application and patent a transceiver for a local area network capable of transmitting over power lines and other wire circuits at very low error rates.

DISCLOSURE OF THE INVENTION

In the present invention we have employed the transceiver disclosed in the above-identified patent and application to communicate along a wire laid along the path of guided vehicles, so that communication may be maintained with the vehicles from a host computer. We employ modems as described in the above-identified patent and application, modified to operate at a carrier frequency of approximately 230 KHz and at a data rate of 18.2 kilobits per second.

We provide transceivers employing one or more of such modems to communicate with one or more loops of wire laid along the paths of the guided vehicles, a communications protocol for communicating between the modems and a host computer or a host vehicle, and a communications bus for connection to further transceivers for driving further loops. In our system all vehicles and the central host appear to be communicating on a single channel.

On each guided vehicle we provide a single modem and protocol for communicating to a computer or terminal on the vehicle or for communicating control signals between the vehicle and the central host.

In a wire quided vehicle system, the fixed modems at the end of the loops are connected to the loops through a specialized coupling network which also provides a connection for the loop driver. This allows low frequency (e.g. between 0 and 30 KHz) signals to be applied on the loop by the loop driver and the modems 230 KHz carrier frequency to be applied to the same loop without interference. On a vehicle, the modems communication channel is connected directly to an inductive coupler.

The specialized inductive coupler employed comprises three ferrite rods and associated coils connected in parallel and appropriately spaced apart and from the wire of the loop.

Another feature of the invention is that the transfer function in transmission from a fixed modem to a vehicle modem is the same as the transfer function in transmission from the vehicle modem to the fixed modem, thus maximizing transmission capabilities in both directions.

We utilize the protocol and modem of the above-identified patent and application to achieve very low error rates. We have improved the modem by providing a switch that provides high damping during transmission and low damping during reception.

Other features of our invention will be apparent from the following detailed disclosure.

OBJECTS OF THE INVENTION

It is therefore an object of the invention to provide a transceiver system for communication over wire laid along the path of guided vehicles.

Another object of the invention is to provide such a system such that a central host may communicate with a plurality of wires laid along the path of guided vehicles.

A further object of the invention is to provide a specialized coupling system for such transceivers connected to wires laid along the paths of wire guided vehicles.

Still another object of the invention is to provide an inductive coupler for transceivers located on the vehicles.

A still further object of the invention is to provide equal amplitude in received signals at fixed and vehicle mounted identical modems.

Others objects of the invention will in part be obvious and will in part appear hereinafter.

The invention accordingly comprises the features of construction, the several elements, the arrangement of parts, and choice of functions and signals which will be exemplified in the construction and system hereinafter set forth. The scope of the invention is indicated in the claims.

BRIEF DESCRIPTION OF THE DRAWINGS

For a further understanding of the nature and objects of the invention reference should be had to the following detailed description taken in connection with the accompanying drawings in which:

FIG. 3 is a schematic block diagram of a specialized coupling network for coupling a modem of FIG. 2 with a loop driver and loop laid along the path of a wire guided vehicle;

FIG. 5 is a listing of the state machine code utilized in the modem of FIG. 4;

The same reference characters refer to the same elements throughout the several views of the drawings.

BEST MODE FOR CARRYING OUT THE INVENTION

Figure 1:
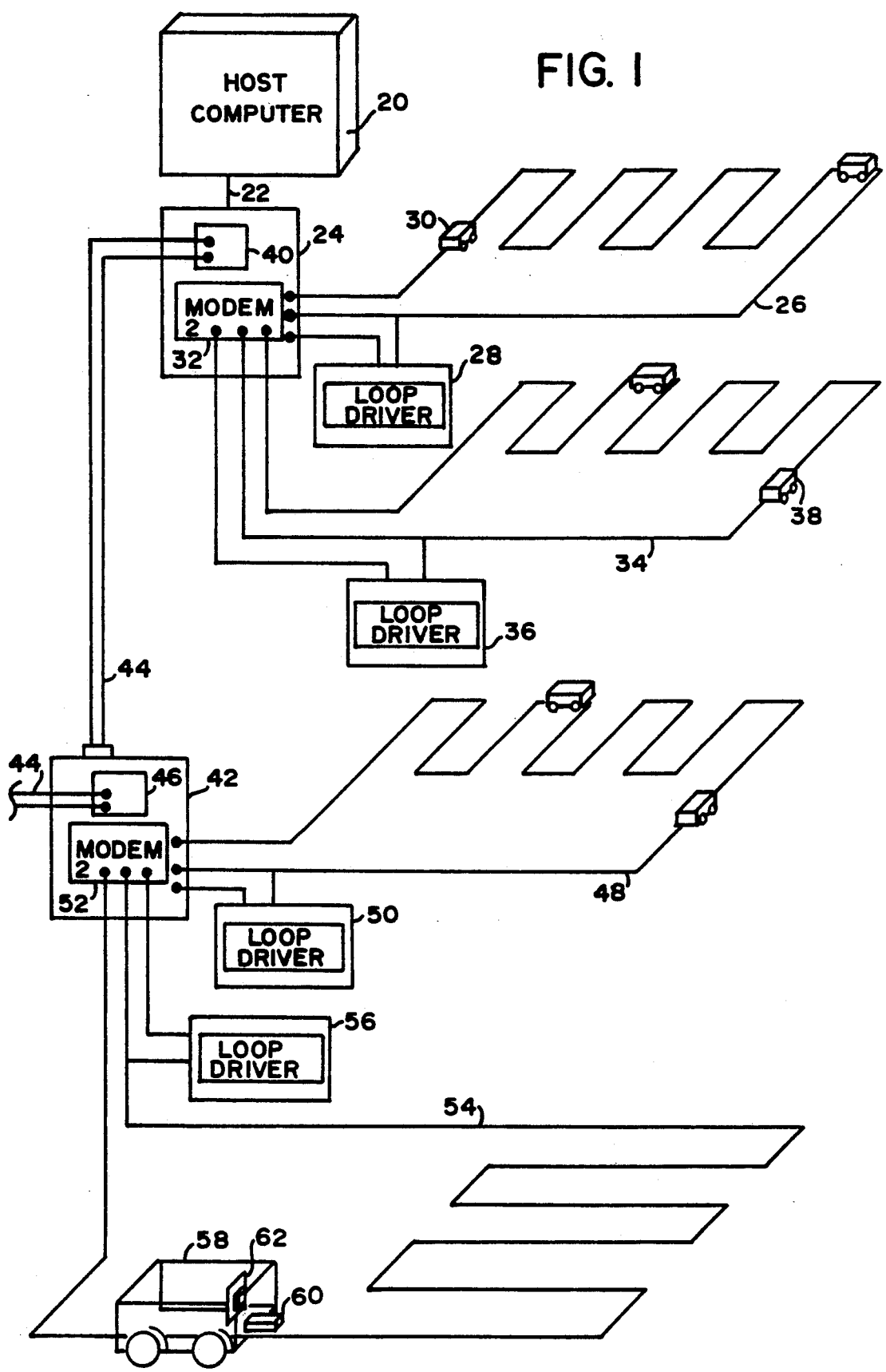
FIG. 1 is a schematic block diagram of a system according to the invention.

A system for communicating with wire guided vehicles is shown in FIG. 1. As shown therein a host computer 20 is connected via communications line 22 to a transceiver 24 according to the invention. A floor loop 26 and loop driver 28 are connected to the transceiver 24. Guided vehicles, for example vehicle 30, is guided along the loop 26 under control of the loop driver 28 and communicates with the host computer 20 via the transceiver 24. The transceiver 24, which incorporates a modem according to the invention, may be provided with a second modem 32 and connected to a second loop 34 and loop driver 36, as shown, to provide communication between the host computer 20 and vehicles such as vehicle 38, guided by loop 34. The transceiver 24 may be provided with a communications bus interface 40 for communicating with another transceiver 42 via communications bus 44. The communications bus interface 40 is connected to both of the modems within the transceiver 24 so that all signals sent from the host 20 are communicated on the communications bus 44 to the second transceiver 42. The transceiver 42 contains one or two modems, identical to those in transceiver 24, and a communications bus interface 46. The interface 40 provides the signals from the host 20 on communications bus 44 to the modems in the transceiver 42. The received signals from the modems in the transceiver are sent back to the host on the communications bus 44. The communications bus 44 may be extended and connected to further transceivers (not shown). The second transceiver 42 is connected to at least one floor loop 48. Its associated loop driver 50 may be connected via a second modem 52 to a second loop 54 and loop driver 56.

It should be emphasized that all signals provided from the host computer 20 are conveyed via transceivers 24 and 42 and communications bus 44 to all of the loops and that the signals from the guided vehicles on all of the loops are provided to the host computer via the transceivers over communications bus 44. The communications bus 44 is preferably an RS 422A bus.

Still referring to FIG. 1, guided vehicle 58 is illustrative of the guided vehicles on the various loops. It comprises the normal guidance control under control of the low frequency signals provided by the loop driver 56. Additionally, according to the invention, it is provided with an inductive coupler 60 and a transceiver 62, again constructed in the manner of the transceivers disclosed in the above-identified application and patent. Transceiver 62 employs a modem connected to the inductive coupler 60 and protocol and communications circuitry for communicating with host devices on the vehicle 58 which may be a computer terminal, control devices for controlling various devices mounted on the vehicle 58, and the like.

Figure 2:
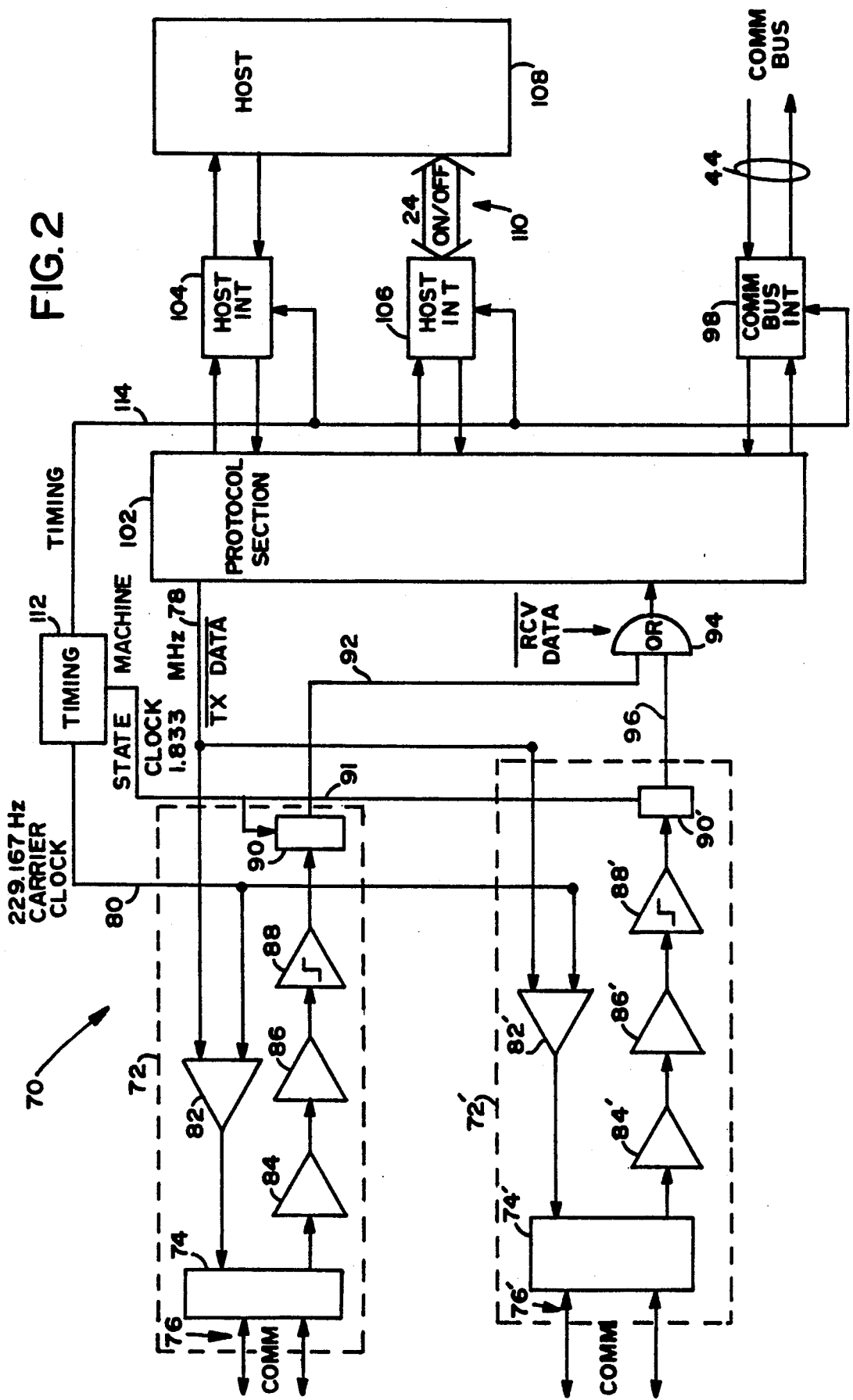
FIG. 2 is a schematic block diagram of a transceiver according to the invention.

The transceivers of the invention are constructed as shown in FIG. 2. The transceivers generally indicated at 70 comprise one or more identical modems 72 and 72' constructed in accordance with the above-identified patent and application, in particular FIGS. 4A to 4D thereof. The modems comprise an analog impedance matching (air-gapped coupling transformer) high pass filter section 74 providing a balanced input/output on communications terminals generally indicated at 76. Data received on transmit data line 78 causes transmitter drive section 82 to key on and off the 229.167 carrier clock signal on line 80 and this signal is supplied through network section 74 to the communication pair 76.

Data received on the communications pair 76 is coupled by section 74 to a clipper and analog front end 84, then to a band pass filter and amplifier 86, and then to a comparator 88. The signal from the comparator 88 is applied to a digital state machine 90 which is also supplied with a 1.833 MHz state machine clock signal. The received data signal as detected by the digital state machine 90 is supplied on line 92 to OR gate 94 where it is ORed with the output on line 96 from the second modem 72'. A protocol section 102 is provided to which one or more host interfaces such as host interface 104 and 106 which may be connected to the host 108.

Host interface 104 may be, for example, either a serial or a parallel interface. Host interface 106 may be, for example, 24 lines of on/off control signals as indicated at 110.

Communications bus interface 98 is connected between the protocol section 102 and the communications bus 44.

The protocol section provides, as disclosed in the above-identified patent and application, a microprocessor connected to receive data signals from the state machine, the microprocessor being programmed for a message format comprising one bit for Ack or Nack, one bit for message sequence number, a data block, and a logical redundancy check. This, combined with the state machine, also constructed in accordance with the above-identified patent and application, which upon receiving the square waves from the comparator 88 is programmed to produce a binary output data signal that changes state only when said square wave has changed between existence and non-existence for a predetermined time provides for data transmission over such noisy transmission channels as floor loops and lines running along rail guided vehicles at extremely low data error rates.

It will be understood that not every transceiver employs each of the interfaces 98, 104 and 106. Normally, when host 108 is the central host computer 20 of FIG. 1, host interface 102 is a serial or parallel, usually a parallel RS222 interface. However, in some instances, all that may be required by the user is a programmable controller providing and responding to 24 on-off control signals on communications line 110 from host interface 106. The communications bus interface 40 of FIG. 1 provides signals received from the host 108 to the outgoing channel on the communications bus and provides the signals received on the incoming channel to the host 108.

In the transceiver 42 of FIG. 1, the host 108 and interfaces 104 and 106 are absent and the communications bus interface 46 receives signals on the outgoing channel of bus 44 and transmits them to the modems 72 and 72' contained therein via the protocol section 102. Signals received from the modems 72 and 72' are transmitted by the protocol section 102 and communications bus interface 46 to the incoming channel of the communications bus 44.

In the case of a vehicle mounted transceiver 62 of FIG. 1, there is no communications interface 98. The host 108 may be a computer or terminal requiring either a serial or parallel host interface 104 or may be a programmable controller requiring the 24 on-off control signals from host interface 106.

A timing circuit 112 supplies the 229.167 Kilohertz carrier clock signal and the 1.833 megahertz state machine clock signal and timing signals on line 114 to the various interfaces.

As disclosed in the above-identified patent and application the modem 72 provides a high impedance when receiving and a low impedance while transmitting.

Now referring to FIG. 3, in the fixed transceivers, such as transceiver 24 and 42 in FIG. 1, the modem 72, for example, loop 26 and, for example, loop driver 28, are connected to a coupling and filter network 116 comprising a high pass filter 118 and low pass filter 120. Filter 118 blocks the zero to 30 kilohertz control signals supplied by the loop driver 28 from interfering with the modem 72 and low pass filter 120 blocks the approximately 230 kilohertz carrier and passes the zero to 30 kilohertz loop driver control signals. Thus, circuit 116 allows the modem 72 and loop driver 28 to be connected to the floor loop 26 without modification by the modem or loop driver.

FIGS. 4A to 4D is a detailed electrical circuit diagram of the modem 72 identifying the components and the values of various components employed in the preferred embodiment of the invention.

FIG. 5 is a listing of the state machine code for the state machine 90.

Figure 4A:
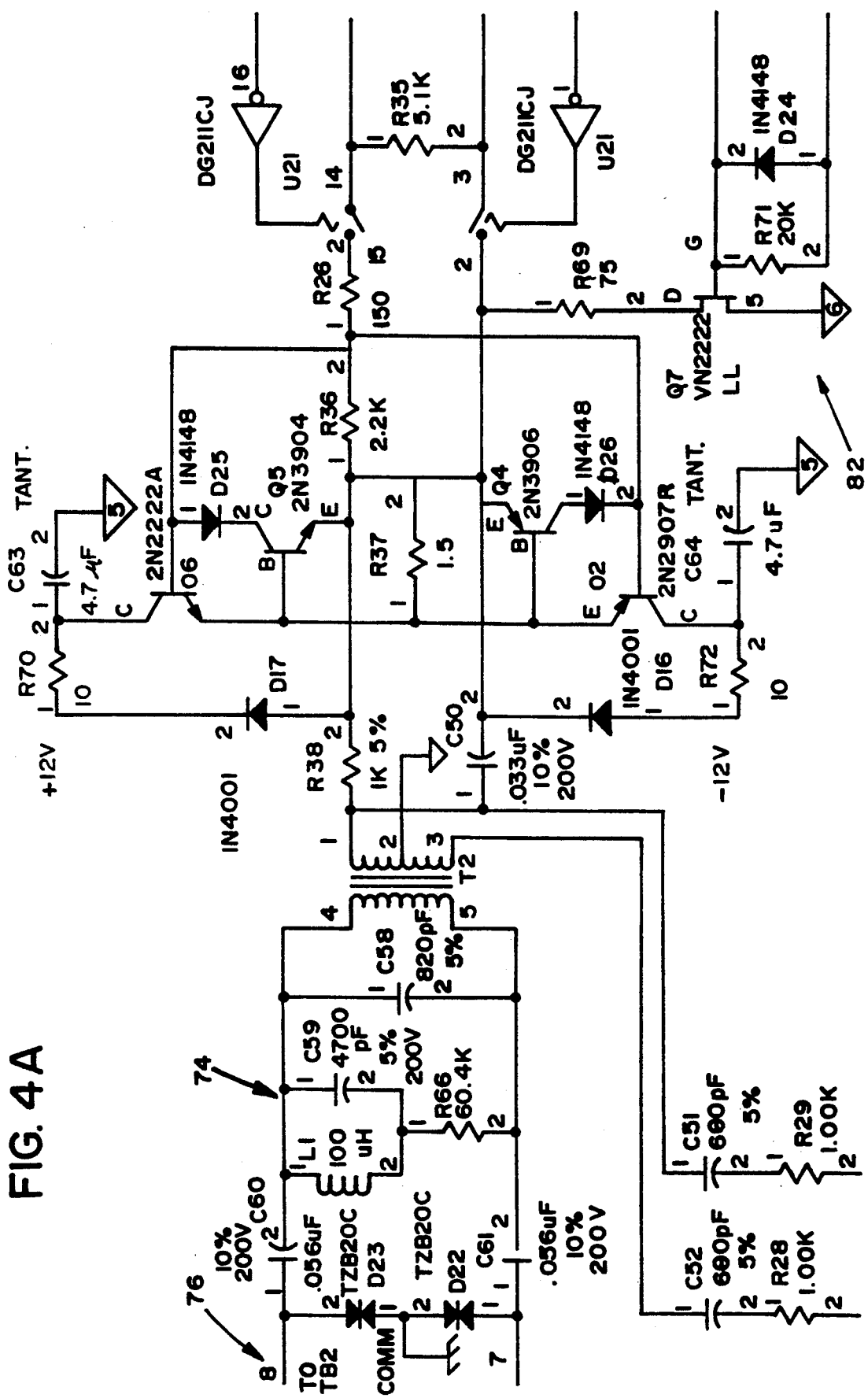
FIGS. 4A to 4D are electrical schematics of a modem according to the invention.

The transmitting portion of the circuit 82 of FIG. 4A has been modified from that disclosed in the above-identified patent and application to improve its damping characteristics. When the carrier is turned off, the reactive elements in the coupling network 74 contain stored energy. If the external load is approximately 200 ohms or less, energy is dissipated rapidly in about one damped carrier cycle into the external load. If the load is not damped, which is often the case, ringing occurs for many cycles after the carrier has been turned off. In order to provide damping under all load conditions, a damping resistor of approximately 75 ohms, resistor R69, is momentarily switched into the driver output for about 20 milliseconds whenever the carrier is turned off. This switching is accomplished by a low resistance, high speed, MOSFET transistor Q7.

Figure 4B:
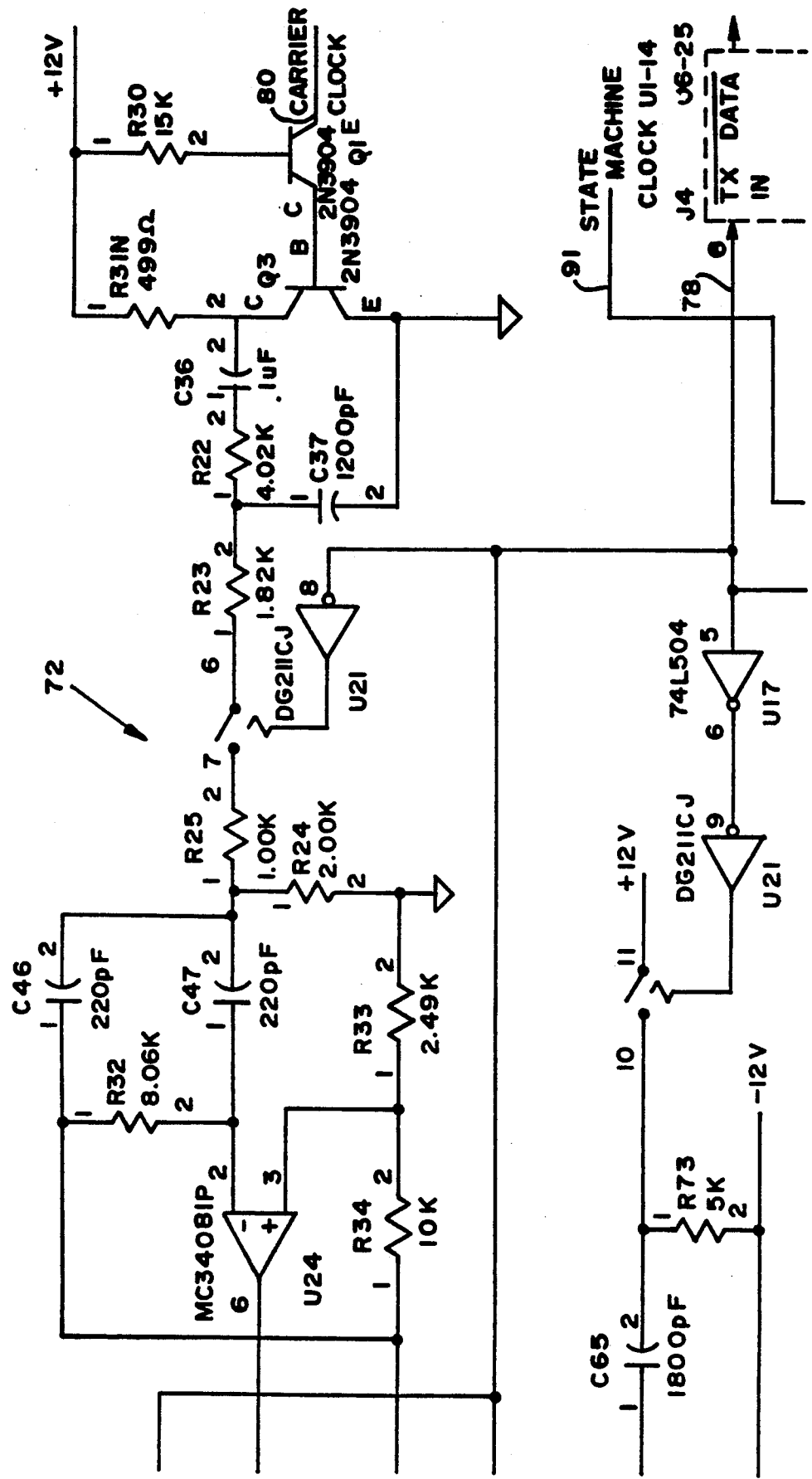
Figure 4C:
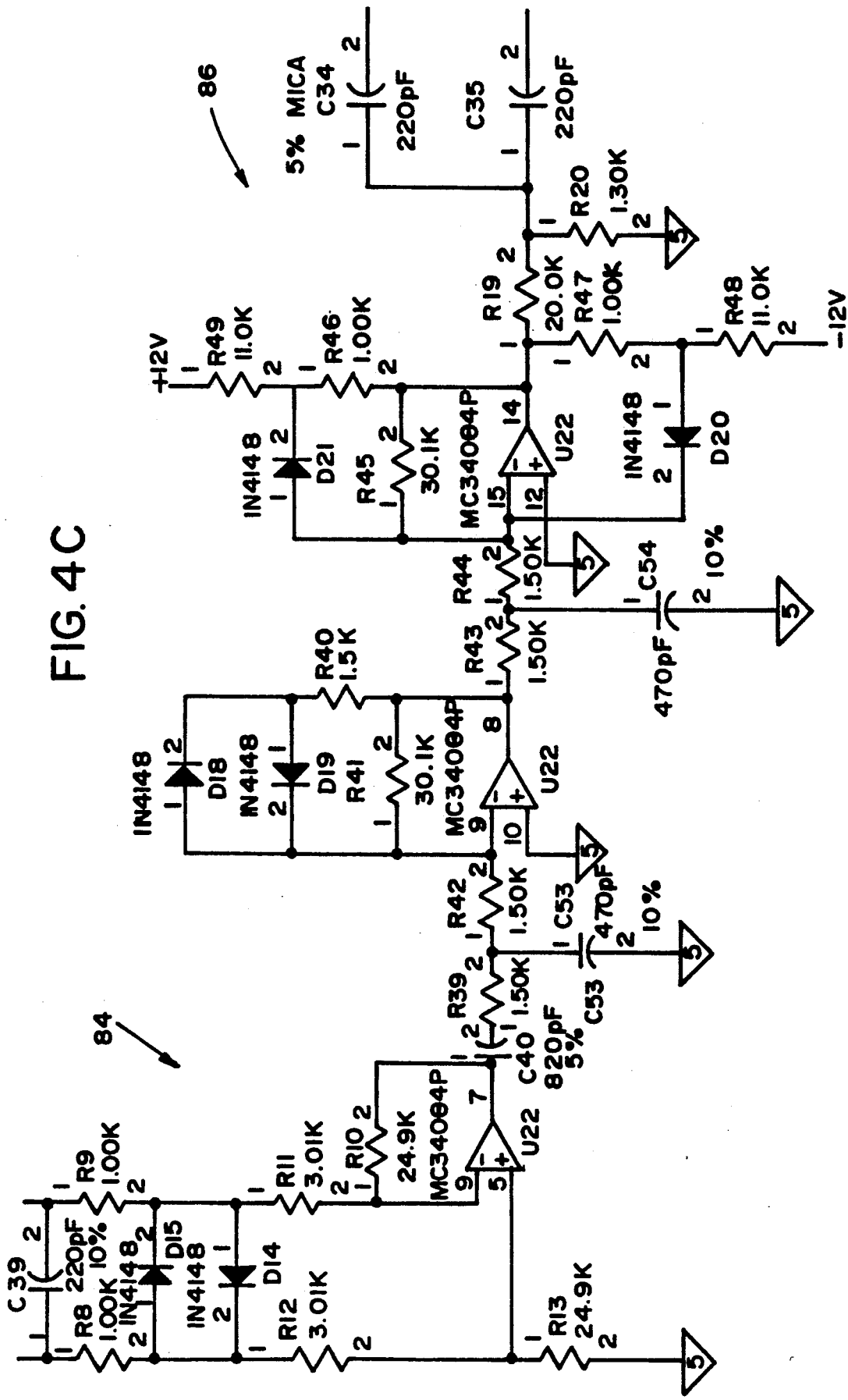
Figure 4D:
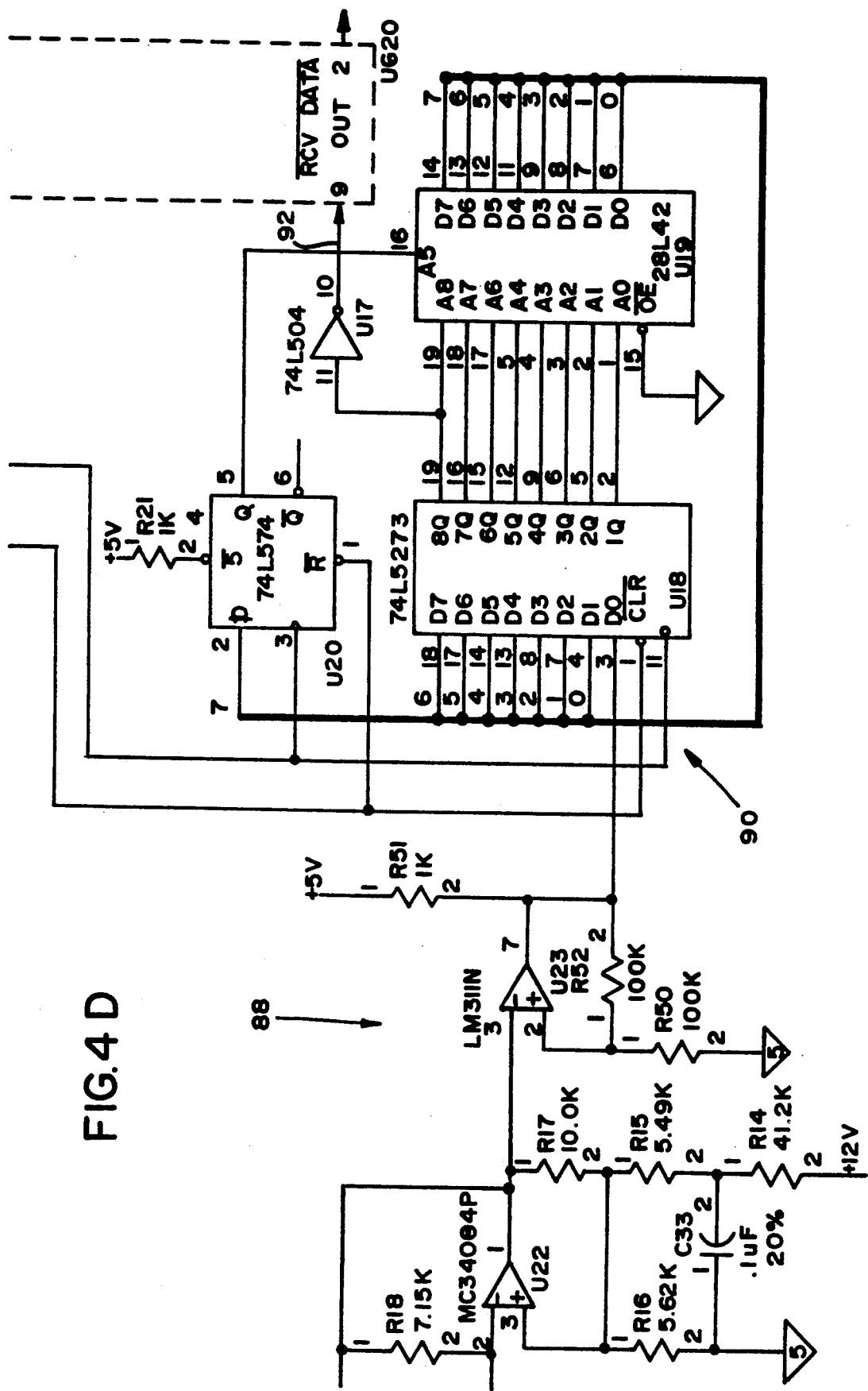

The modem 72 of FIG. 4B provides for a high output drive of about 12 volts, peak to peak, into a 100 ohm load. Active current limiting is incorporated in the driver output stage to protect the driver transistors under external fault load conditions.

The receiver sensitivity is about 10 millivolts, peak to peak, threshold. To provide for a wide dynamic input amplitude range from about 10 millivolts to 10 volts, peak to peak, three stages of diode limiting are incorporated into the receiver chain. This compresses the sixty db input range to about 4 db range at the filter output.

Figure 6:
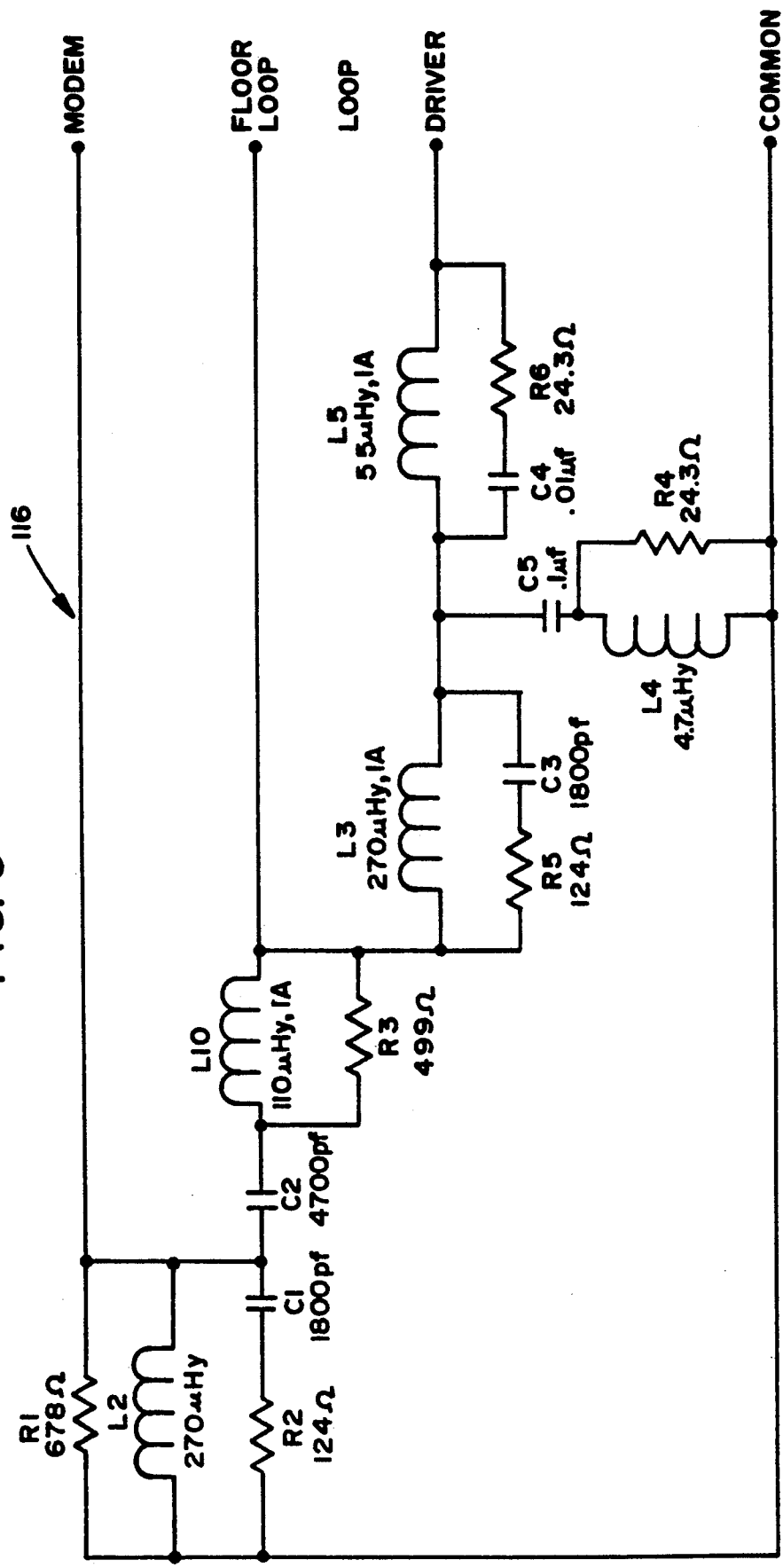
FIG. 6 is an electrical schematic diagram of the specialized coupling network of FIG. 3.

FIG. 6 is a detailed electrical circuit diagram of the coupling and filter network 116 of FIG. 3, giving the values of the various components employed.

Referring again to FIGS. 1 and 2, those skilled in the art will understand that in the case of transceiver 24 the host 108 is the host computer 20. In the transceiver 42 there is no host computer 108. Rather, signals received on the communications bus 44 are transmitted by the one or more modems and signals received by the one or more modems and signals received by the one or more modems are transmitted by communications bus interface 98 to communications line bus.

Figure 8:
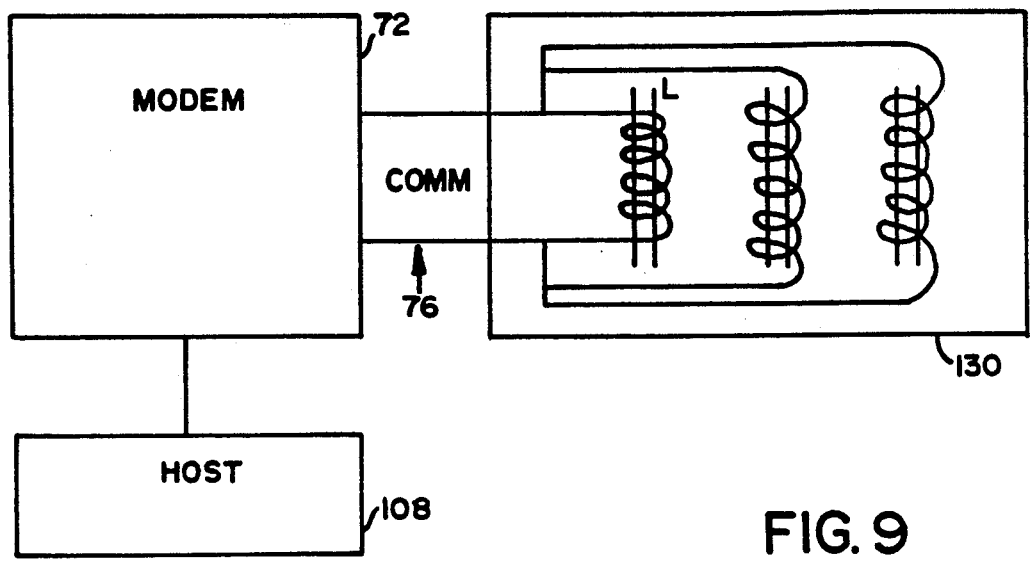
FIG. 8 is a schematic block diagram of the transceiver system of a vehicle according to the invention.
Figure 9:
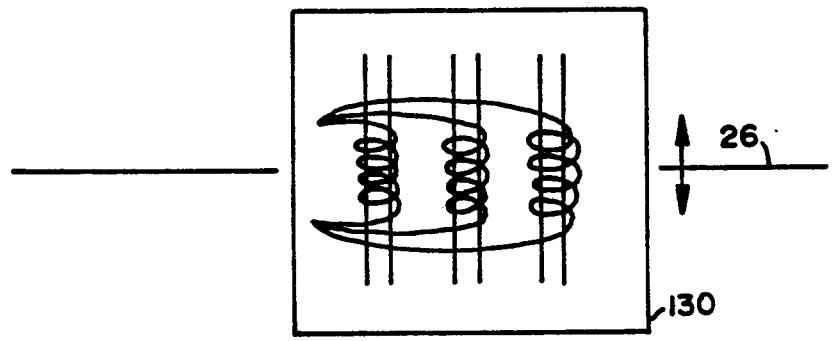
FIG. 9 is a schematic top view of the inductive coupler of the invention in its relation to a wire laid along the path of guided vehicles.

Still referring to FIG. 1 and 2, the transceiver 62 located on the vehicle 58 may have as its host 108 a computer or a computer terminal or a 24 line on/off control. No communications line interface 98 is required. The balanced communication input/output 76 of the modem 72 is connected to a special inductive coupler 130 also shown in FIG. 8.

Figure 7:
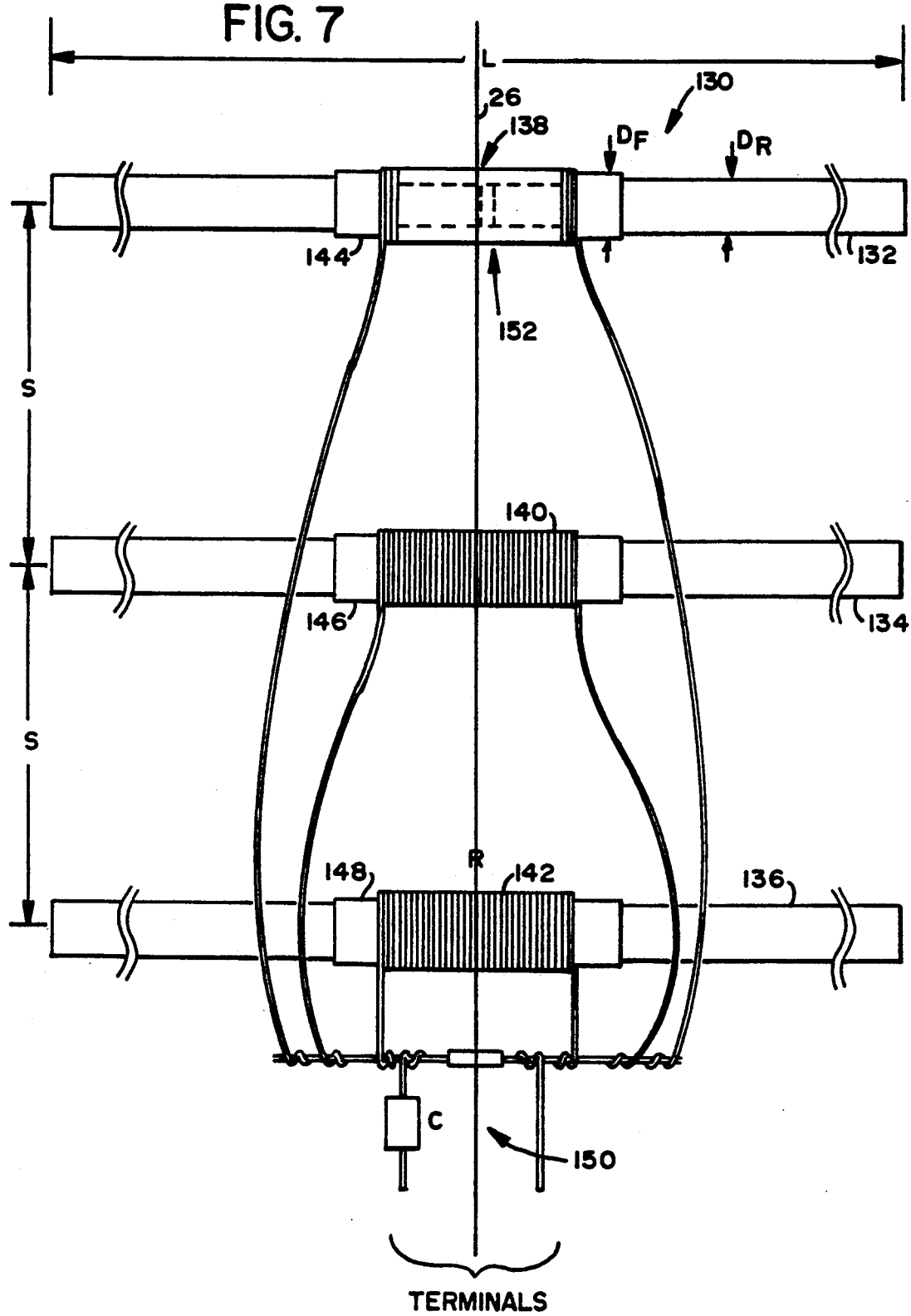
FIG. 7 is a schematic diagram of an inductive coupler the invention.

The coupler comprises three ferrite rods, 132, 134, and 136, arranged parallel to each other in a plane. The rods have coils wound thereon along their center line spaced from the rods by paper tubes 144, 146, and 148. An RC network generally indicated at 150 is used to tune the coils 138, 140, and 142 which are connected in parallel. The ferrite rods 132, 134, and 136 are 15 inches long when the coupler 130 is mounted away from the vertical turn axis of the guided vehicle which causes a large deviation of the guide wire, for example guide wire 26 as shown in FIG. 7, when the vehicle turns. When the coupler 130 can be mounted at the vehicle turning axis, 7½ inch ferrite rods may be employed. Rather than utilizing an integral 15 inch rod, two 7½ inch rods may be butted together to form a 15 inch rod as indicated at 152. The spacing S between the rods is 2.5 inches and the rod diameter $D_R$ is 3.75 inches, the outer diameter of the paper tube 144 is 0.05 to 0.1 inches greater than that of the ferrite rod 132. This is true of the diameters of all of the ferrite rods and paper tubes.

The ferrite rods used are Stackpole 55-9001 (initial permeability=2000) C24B ferrite material. Any ferrite having equal or greater permeability with equivalent or lesser loss at 230 KHz is useable.

The ferrite rod diameter is 0.375". Below this diameter, antenna gain decreases. Above this diameter, gain increases only slightly for a given rod length. A fourth rod may be employed to increase gain.

Since demagnetization effects cause flux to escape from the sides of the rods reducing their effective inductive coupling to the wire 26, the coupling can be improved up to a ratio of length to distance of about 40. Beyond that very little improvement can be obtained.

Rod length (L) is 7.5" for single length, 15' for double length. For double length, two 7.5' rods are butted end-to-end with the joint center inside the coil. Double length increases centered gain (antenna centered over floor loop wire) by about 50% and extends lateral offset capability. The rods must be spaced so mutual coupling between adjacent rods is less than 0.15. For the spacing used (2.5'), the mutual coupling measured between single length sections is 0.10.

Each coil is 100 turns of No. 28 wire close wound. The coil must be wound on a low dielectric constant material (e.g. paper) form of 0.050" to 0.100" wall thickness. The self resonance frequency ($F_{sr}$) is approximately equal to at least 900 KHz, 3 times the carrier frequency. The coil cannot be wound directly on the rod as the proximity of the ferrite lowers the self resonant frequency $F_{SR}$ to approximately 400 KHz.

Figure 10:
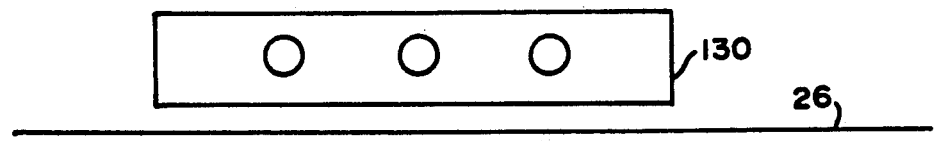
FIG. 10 is a vertical plane view of the apparatus shown in 9.

As shown in FIG. 10, the plane of the inductive coupler 130 is parallel to the floor and is preferably located at a height approximately 6 inches above the guide wire 26.

Figure 11:
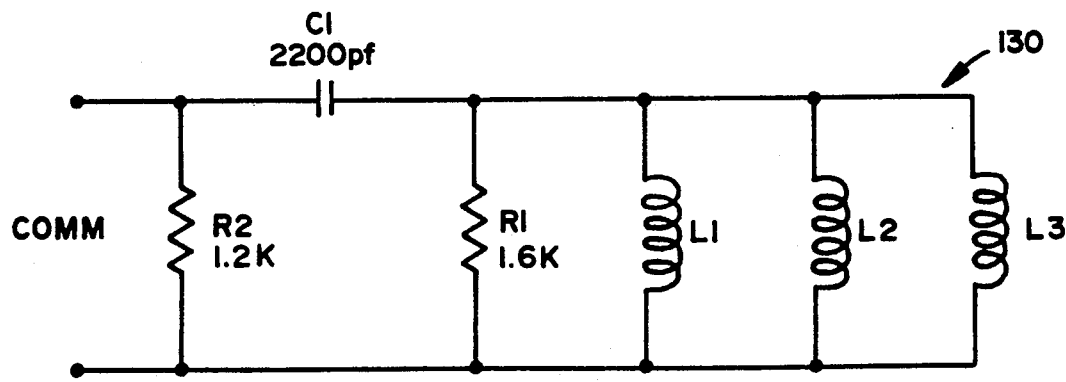
FIG. 11 is a schematic electrical diagram of the inductive coupler of the invention.

FIG. 11 is an electrical circuit diagram of the inductive coupler 130 showing the RC circuit employed with the values of the components thereof.

The inductive coupler 130 is preferably mounted in a sturdy and shock resistant structure such as styrofoam to maintain the spacing and parallelism of the ferrite rods and to protect the fragile ferrite rods from breakage.

Figure 12:
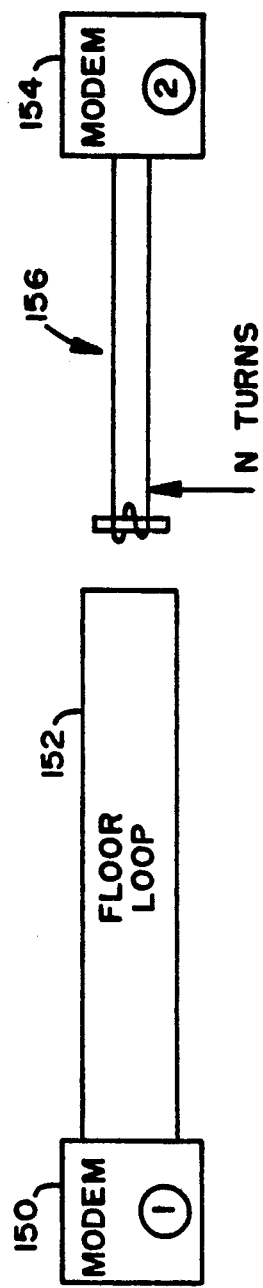
FIGS. 12, 13 and 14 are explanatory diagrams of the method for maximizing transmission efficiency of the system according to the invention.

FIG. 12 is a schematic circuit diagram showing a modem 150, also identified as modem 1 in the diagram, connected to a floor loop 152, and a vehicle mounted modem 154, also referred to in the diagram as modem 2, connected to an inductive coupler 156, all constructed according to the invention.

Figure 13:
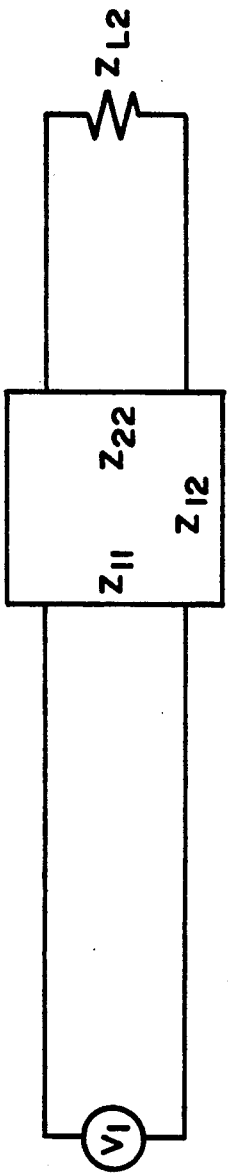

FIG. 13 is a schematic diagram of the transfer function from modem 150 to modem 154.

Figure 14:
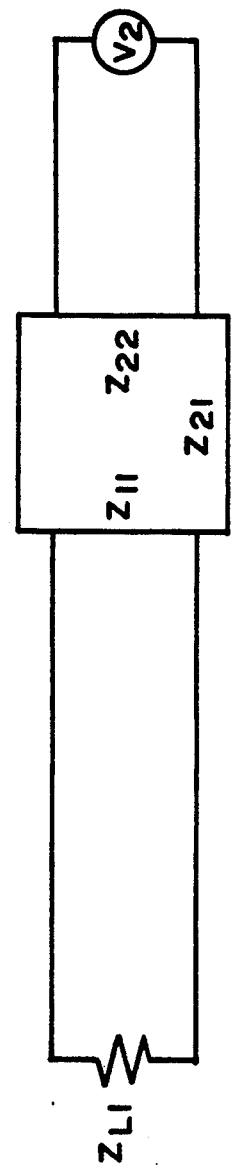

FIG. 14 is a schematic diagram of the transfer function during transmission from modem 154 to modem 150.

The transfer function for FIG. 13 is written as:

$$T_{12} = \frac{V_1}{Z_{11}} Z_{12} \frac{Z_{L2}}{Z_{22} + Z_{L2}}$$

The transfer function for FIG. 14 is written as:

$$T_{21} = \frac{V_2}{Z_{22}} Z_{21} \frac{Z_{L1}}{Z_{11} + Z_{L1}}$$

$V_1$ is the voltage applied by fixed modem 1 to the floor loop.
$V_2$ is the voltage applied by vehicle modem 2 to the inductive coupler.
$Z_{11}$ is the impedance of the floor loop.
$Z_{22}$ is the impedance of the inductive coupler.
$Z_{12}$ is the mutual impedance between the floor loop and the inductive coupler during transmission from fixed modem 1.
$Z_{21}$ is the mutual impedance between the inductive coupler and the floor loop on transmission from the vehicle modem 2.

In order to be able to use identical modems and produce identical voltages in the received signals in both modems we want to make the transfer functions for both cases illustrated in FIGS. 13 and 14 equal. That is:

$$Z_{12} = \text{transfer } Z = Z_{21}$$

For the simple inductance case $$Z_{11} = L_{loop}, Z_{22} = L_{coupler}, Z_{12} = Z_{21} = M,$$

when
$L_{Loop}$ is the floor loop inductance.
$L_{coupler}$ is the inductive coupler inductance.
$M$ is the mutual impedance.
Assuming minimal loading, then $$\frac{Z_{L2}}{Z_{22} + Z_{L2}} = 1, \text{ and}$$

$$\frac{Z_{L1}}{Z_{11} + Z_{L1}} = 1.$$

$$M = K(d) G_m N u_{eH},$$

where
$K(d)$ is the coupling variation with distance (coupler to wire)
$G_m$ is the geometry factor for mutual impedance
$N$ is the number of turns on the ferrite rod
$u_{eH}$ is the effective rod permeability
$L_{coupler} = G_a N^2 u_{eH}$, where
$G_a$ is the geometry factor for antenna inductance For $$T_{12} = T_{21},$$

then $$\frac{K(d) G_m N u_{eH}}{L_{loop}} = \frac{K(d) G_m N u_{eH}}{G_a N^2 u_{eH}}$$

and $$L_{loop} = G_a N^2 u_{eH}$$

Note that increase in N increases $T_{12}$ but decreases $T_{21}$.

So for a given rod, N can be optimized for given $L_{loop}$.

Floor Loop inductances calculated vary from 300 to 3000 uHy, so 1000 uHy is selected for nominal $L_{coupler}$. More generally, we want $$\frac{Z_{12}}{Z_{11}} = \frac{Z_{21}}{Z_{21}}$$

neglecting loading effects. Network theory states $Z_{12} = Z_{21}$ for passive networks, so $Z_{11} = Z_{22}$. Therefore, we can also use series capacitance to cancel portions of the inductances. This is limited by transient response. Reduction of inductive reactance by a given factor corresponds to a specific Q of the circuit. Since Q values of about 5 to 8 are practical limits, each inductive reactance (loop and coupler) can be cancelled proportionately by the same factor. Hence, N optimization still applies. Since M is not affected by this cancellation, $T_{12}$ and $T_{21}$ are increased.

In this way the number of turns of wire on the ferrite rods is determined as well as certain components of the coupling network 116.

Now referring to FIG. 6, the coupling circuit 116 provides isolation between the high frequency modem output of approximately 230 KHz and the low frequency loop driver outputs ranging from zero to 30 KHz, usually about 12 KHz.

The T filter comprising inductances L3, L4, and L5 and associated components provides a low pass, low insertion loss from the loop driver to the floor loop in order to minimize attenuation of the loop drive signals.

At the signal carrier frequency of approximately 230 KHz, inductances L3 and L5 and associated components are parallel resonant and provide a high impedance and inductor L4 and associated components are series resonant and provide a low impedance. This reduces signal carrier frequency feed through to the loop driver and minimizes loop loading by the T filter at the carrier frequency. The remaining components of the circuit 116 are chosen so that the negative capacitive reactance cancels a major portion of the positive loop reactance at the signal carrier frequency, thus improving coupling of the signal from the modem to the floor loop. While this section could be optimized for a given installation, the values shown are selected to give the best performance for average floor loop parameters. This section provides a high impedance of low frequency, providing attenuation of the loop driver signals. This section also provides for some additional transient damping when the signal carrier is turned on.

The inductor capacitor combinations are selected for appropriate parallel and series resonance at the carrier frequency. The resistance values throughout and section impedance levels are selected to provide the best compromise between steady state attenuation requirements and transient response during carrier turn on and turn off, maximization of signal coupling from the modem to the loop, and minimization of loading of the carrier signal level received from the loop.

It will thus be seen that the objects set forth above, among those made apparent from the preceding description are efficiently attained and since certain changes may be made in the above system and construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which as a matter of language, might be said to fall therebetween.

Having described our invention, what we claim as new and desire to secure by Letters Patent is:

1. A system for two-way digital signal communication at a predetermined carrier frequency between a central host and guided vehicles following predetermined paths comprising:
   A) one or more vehicle guide wires, each laid along a different predetermined path of the vehicles and forming a loop circuit;
   B) substantially identical modems, one of said modems being fixedly connected to said central host and to said loop circuit, and one of said modems mounted on one of said vehicles guided along said wires of said loop circuit for communication of digital signals between said fixed modem and said vehicle modem;
   C) at least one vehicle coupling circuit comprising at least one ferrite rod forming a single transmitting and receiving antenna and having a coil wound around said rod, and said coupling circuit connected to said vehicle modem and spaced for inductive coupling to one of said wires;
   the number of turns on said coil, the geometry and permeability of said rod, and the impedance of said vehicle coupling circuit being chosen such that the mutual impedance between said vehicle coupling circuit and said loop circuit guiding said vehicle on transmission from said vehicle modem to said fixed modem connected to said loop circuit is equal to the mutual impedance between said loop circuit and the vehicle coupling circuit on transmission from said fixed modem connected to said loop circuit to said vehicle modem at said carrier frequency.

2. The system defined in claim 1 wherein in said at least one vehicle coupling circuit
   D) said at least one ferrite rod is one of a plurality of ferrite rods forming said single antenna
      a) each said rod having a coil around said rod, said coils connected in parallel,
      b) said rods being parallel and in a plane parallel to said wire;
      c) said rods' length to diameter ratio being within a range from about 20 to 1 to about 40 to 1, and
      d) said rods being spaced apart such that mutual coupling between the rods is less than 0.15.

3. The system defined in claim 2 wherein said modems further comprise:
   A. a state machine for receiving a square wave derived from said carrier frequency said state machine being programmed to produce a digital signal comprising binary output data signal that changes state only after said square wave has changed between existence and nonexistence for a predetermined time; and
   B. a microprocessor connected to receive said data signal from said state machine, and said microprocessor being programmed for a message format comprising:
      1 bit for Ack or Nack;
      A data block; and
      A logical redundancy check.

4. The system defined in claim 3 wherein said carrier frequency is of the order of 230 KiloHertz.

5. The system defined in claim 2 wherein said vehicle coupling circuit comprises and R-C network.

6. The system defined in claim 2 wherein said modems employ on-off carrier keying and comprise an energy storing output section and a damping circuit, and said damping circuit is momentarily switched into said energy storing output section at the end of a carrier transmission.

7. The system defined in claim 2 wherein said modems comprise a receiver comprising:
   A. means for detecting said carrier frequency and for providing a square wave corresponding to said carrier frequency; and
   B. a state machine for receiving said square wave, said state machine being programmed to produce a binary output data signal that changes state only after said square wave has changed between existence and nonexistence for a predetermined time duration.

8. The system defined in claim 7 wherein said carrier frequency is of the order of 230 KiloHertz.

9. The system defined in claim 2 wherein said vehicles are guided by a low frequency signal on said loop circuit of 0 to 30 KiloHertz and said carrier frequency is in the order of 230 KiloHertz.

10. The system defined in claim 2 wherein said modems further comprise:
    A. a state machine for receiving a square wave derived from said carrier frequency, said state machine being programmed to produce a digital signal comprising binary output data signal that changes state only after said square wave has changed between existence and nonexistence for a predetermined time; and
    B. a microprocessor connected to receive said data signal from said state machine, and said microprocessor being programmed for a message format comprising:

1 bit for Ack or Nack;
1 bit for a message sequence number;
A data block; and
A logical redundancy check.

11. The system defined in claim 10 wherein said carrier frequency is of the order of 230 KiloHertz.

12. The system defined in claim 1 wherein said modems comprise a receiver comprising:
A. means for detecting said carrier frequency and for providing a square wave corresponding to said carrier frequency; and
B. a state machine for receiving said square wave, said state machine being programmed to produce a digital signal comprising a binary output data signal that changes state only after said square wave has changed between existence and nonexistence for a predetermined time duration.

13. The system defined in claim 12 wherein said carrier frequency is of the order of 230 KiloHertz.

14. The system defined in claim 1 wherein each of said modems further comprise:
A. a state machine for receiving a square wave derived from said carrier frequency, said state machine being programmed to produce a digital signal comprising binary output data signal that changes state only after said square wave has changed between existence and nonexistence for a predetermined time; and
B. a microprocessor connected to receive said data signal from said state machine, and said microprocessor being programmed for a message format comprising:
1 bit for Ack or Nack;
1 bit for a message sequence number;
A data block; and
A logical redundancy check.

15. The system defined in claim 14 wherein said carrier frequency is of the order of 230 KiloHertz.

16. The system defined in claim 1 wherein said modems employ on/off carrier keying and comprise an energy storing output section and a damping circuit, and said damping circuit is momentarily switched into said energy storing output section at the end of a carrier transmission.

17. The system defined in claim 1 wherein said vehicles are guided by a low frequency signal on said loop circuit of 0 to 30 KiloHertz and said carrier frequency is in the order of 230 KiloHertz.

18. The system defined in claim 1 wherein each of said modems further comprise:
A. a state machine for receiving a square wave derived from received said carrier frequency, said state machine being programmed to produce a digital signal comprising binary output data signal that changes state only after said square wave has changed between existence and nonexistence for a predetermined time; and
B. a microprocessor connected to receive said data signal from said state machine, and said microprocessor being programmed for a message format comprising:
1 bit for Ack or Nack;
A data block; and
A logical redundancy check.

* * * * *